S. PAGE.
Fruit-Gatherer.
No 66,517.
Patented July 9, 1867.
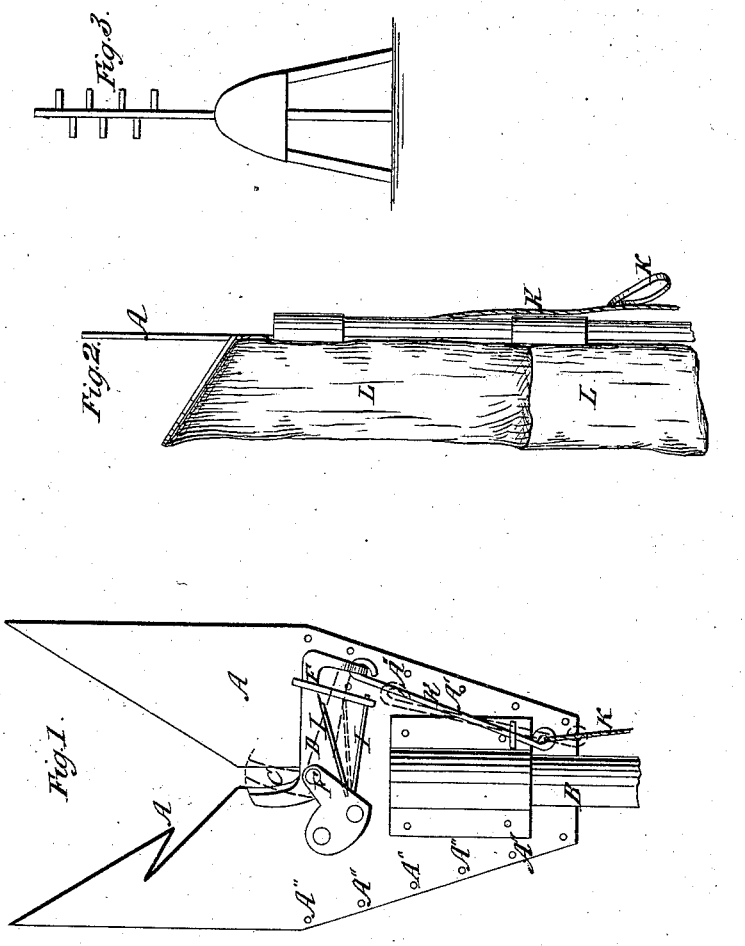

United States Patent Office.

SAMUEL PAGE, OF McALLISTERSVILLE, PENNSYLVANIA.

Letters Patent No. 66,517, dated July 9, 1867.

---

IMPROVEMENT IN FRUIT-PICKER.

---

*The Schedule referred to in these Letters Patent and making part of the same.*

---

TO ALL WHOM IT MAY CONCERN:

Be it known that I, SAMUEL PAGE, of McAllistersville, in the county of Juniata, and State of Pennsylvania, have invented a new and useful Improvement in Fruit-Gatherers; and I do hereby declare the following to be a full, clear, and exact description of the same, reference being had to the annexed drawings, making a part of this specification, in which—

Figure 1 is a front elevation showing the cutting device.

Figure 2, a side view showing the bag attached.

Figure 3, an elevation of a rest or stand.

Letters of reference when they occur in the several figures denote identical parts.

A is a metallic plate, with a socket at its lower end by which it is attached to a handle or pole, B. Its upper end is forked with a recess, C, cut at the bottom. Near the bottom of recess C is a shearing-knife, D, attached to the face of the metallic plate A pivoted at E, the lever to which the power is applied in the guide F. To the lower end of the handle of the knife a rod or cord is attached, which is drawn down by the operator when he has the fruit in the right position and wishes to pluck it. By pulling the cord the knife will turn on its pivot, and occupy a position as shown in fig. 1 by red lines. The sharp edge D' will move across the recess C, covering the inserted stem, and the fruit will drop down into bag G. A spring, I, which rests on the guide F, and against the lower side of the knife keeps the shears open, leaving the recess C unobstructed and ready to receive a stem. From this position (shown in fig. 1 with black lines) the knife does not move unless when pulled by the cord attached to its lower end. One or both sides of the forked opening may be provided with triangular cuts A', which may be hooked over the stem and used for plucking the fruit whenever it can be done more conveniently in that manner. The metallic plate A is provided at its lower sides with holes A", through which the bag is fastened, and at the top suspended by a hoop or rod. The pole B may consist of one or more sections jointed together by metallic sleeves, and is provided with eyes through which the cord passes, and is kept close to the pole so as not to be entangled in the foliage. As the pole may consist of one or more pieces so the bag may also consist of more pieces attached to each other by hooks and eyes, or some other convenient device. The cord is supplied with an elastic strap which serves to sustain the cord when it gets too long. A stand or rest may be employed with advantage, when the pole is long and heavy. Fig. 3 shows such a rest. It consists of a perpendicular pole, provided with horizontal pegs on which to rest the pole of the fruit-gatherer. The stand rests on legs, and may easily be moved from place to place

What I claim as my invention, and desire to secure by Letters Patent, is—

1. The combination of the forked plate A with notches A', recess C, handle B, shearing-knife D, and cord K, said several parts being respectively constructed and arranged for use, substantially as described.

2. The combination of the fruit-picker and adjustable rest, as shown in fig. 3, substantially as described.

In testimony whereof I have signed my name to this specification in the presence of two subscribing witnesses.

SAMUEL PAGE.

Witnesses:
SAMUEL LEONARD,
MAURICE LEONARD.